Oct. 23, 1962 E. R. ROWE 3,059,286
SHOP FABRICATED VERTICAL PLANK CONSTRUCTIONS
Filed Dec. 6, 1957 4 Sheets-Sheet 2
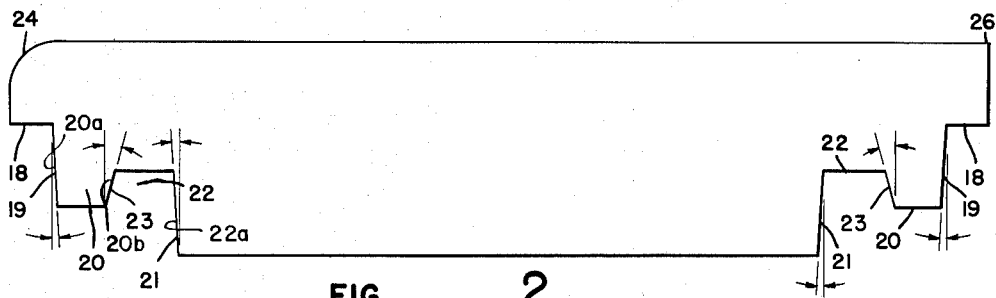
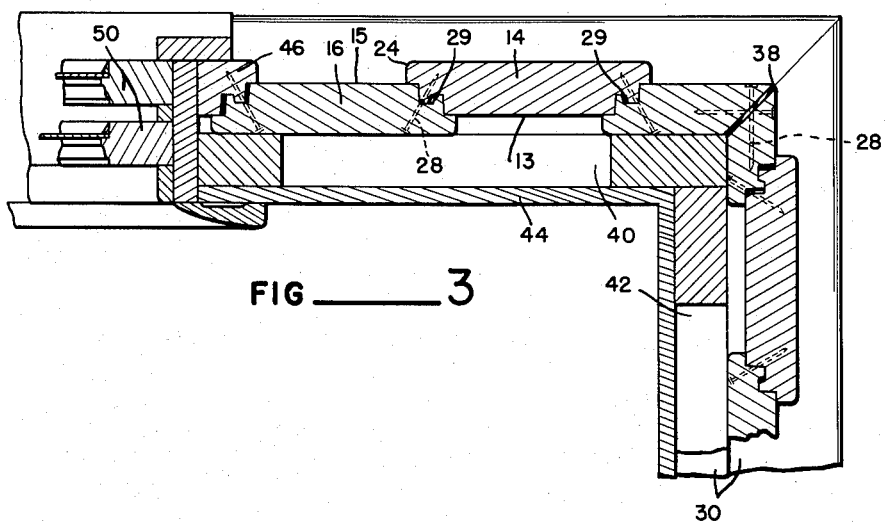
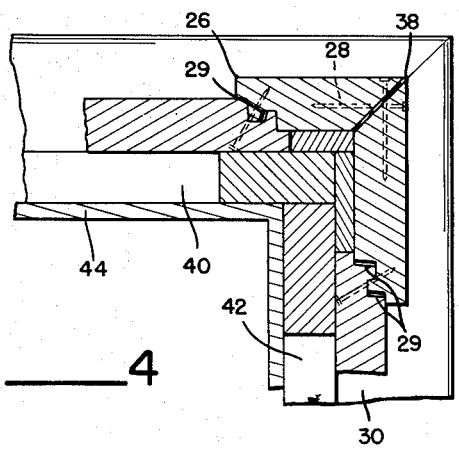
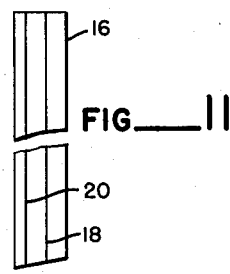
EARL R. ROWE
*INVENTOR.*
BY *Smith & Tuck*

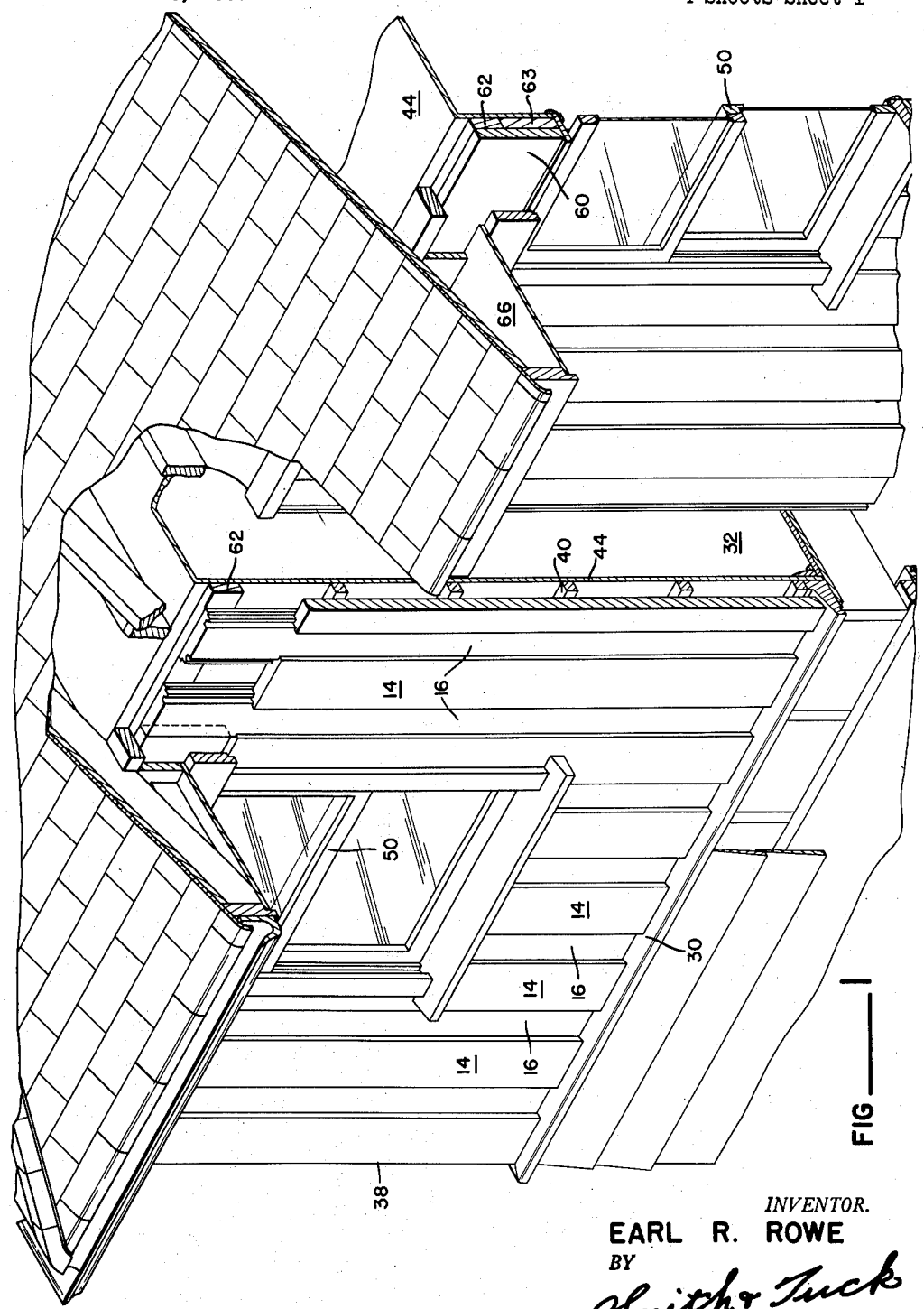

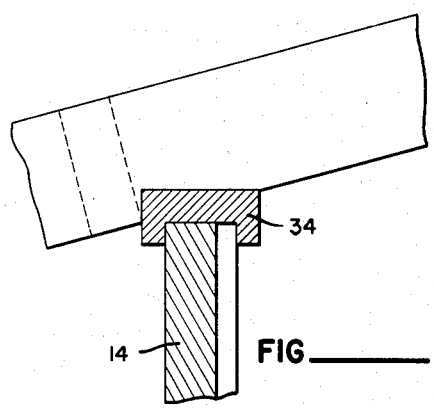
FIG. 5
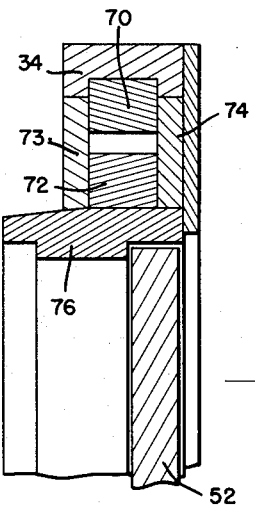
FIG. 7
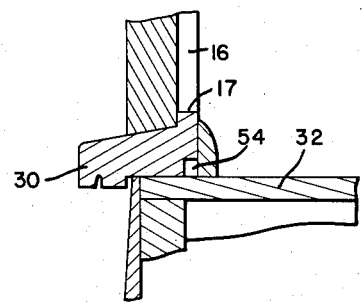
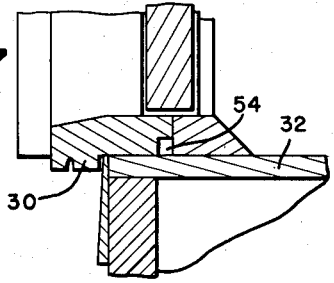
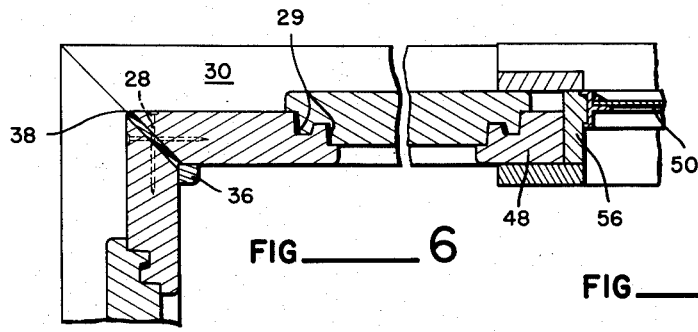
FIG. 6
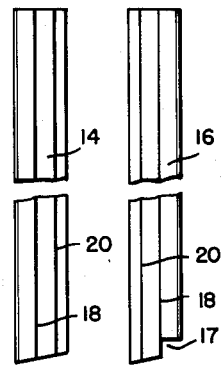
FIG. 9
FIG. 10
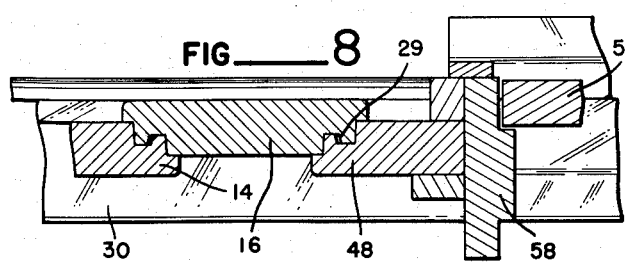
FIG. 8
EARL R. ROWE
*INVENTOR.*
BY Smith & Truck

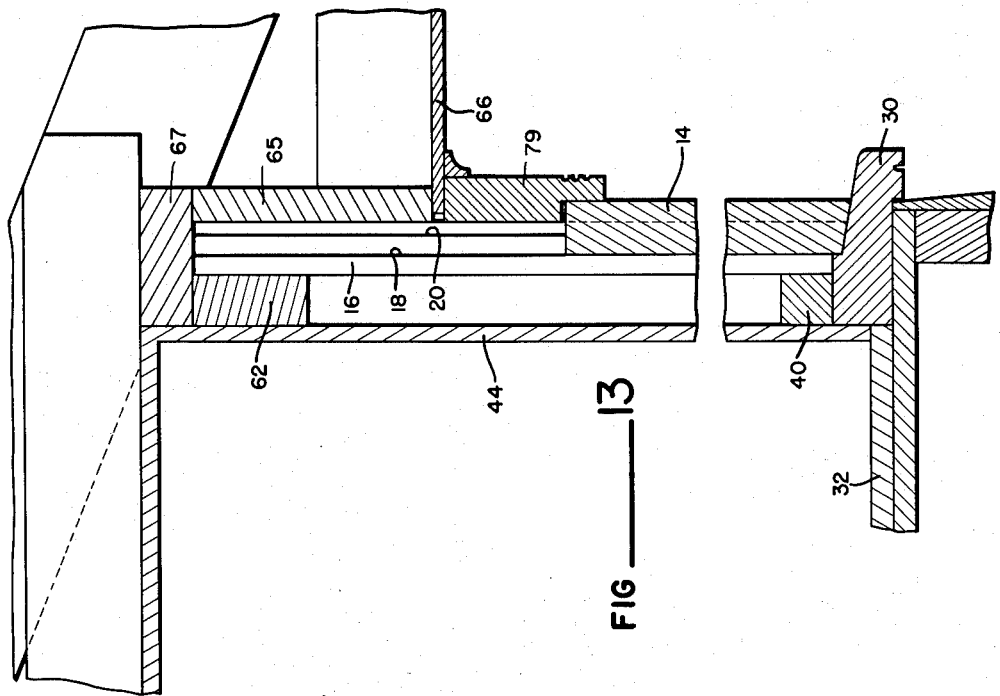
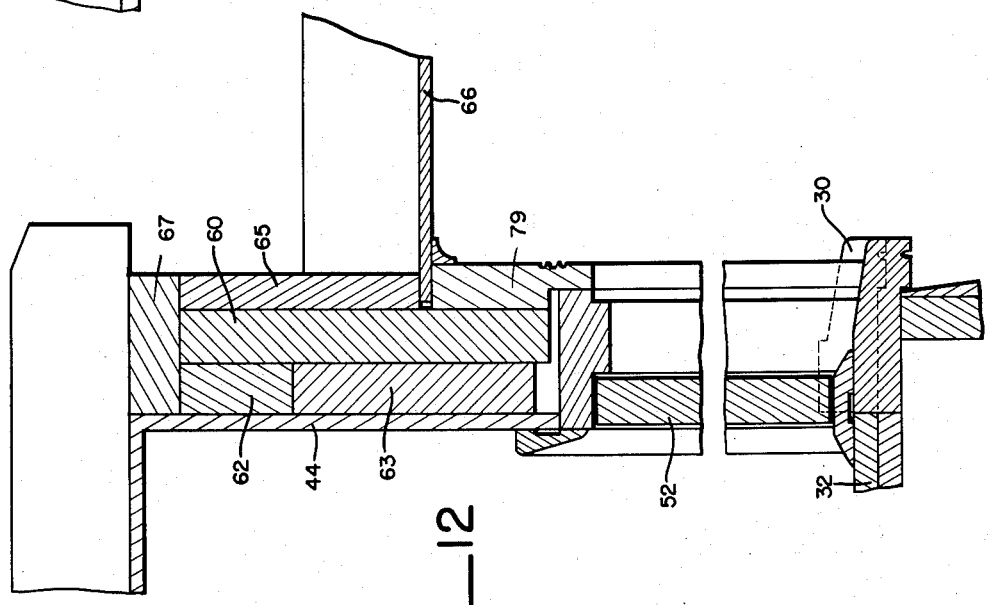

United States Patent Office 3,059,286
Patented Oct. 23, 1962

3,059,286
SHOP FABRICATED VERTICAL PLANK
CONSTRUCTIONS
Earl R. Rowe, 614 N. Fairview Drive, Tacoma, Wash.
Filed Dec. 6, 1957, Ser. No. 701,120
3 Claims. (Cl. 20—4)

This present invention relates to the general class of building structural items primarily intended for the smaller single story buildings such as homes and the like and more particularly the invention relates to the vertical plank wall construction which is shop fabricated on precision machine equipment so that the various elements will all be uniform in critical dimensions and thus can be assembled by largely inexperienced or at least unskilled workmen and in many instances can be erected satisfactorily by the owner.

This present invention has as a general purpose the reduction in the cost of home building by the expedient of factory machining or fabricating the individual pieces of material used. This is in distinction to the general run of prefabricated houses in which modular panel constructions are assembled in a factory and then shipped in panel form. The panel type has one apparent objection in that it makes it difficult to use the modular system and still give the wide variation in appearance of the finished home which is so much desired by the home owner who is having his home built ostensibly to his order. This present construction supplies the vertical plank members and their associated parts in a prefinished form but each as a separate piece. With this arrangement the separate elements may be erected in a manner to allow full rein for design considerations and particularly the combining of the vertical plank construction with a stone or brick or other building materials in order to achieve a desirable custom effect.

This present application has certain points in common with the construction shown in U.S. Patent No. 2,300,937.

The principal object of this present invention, therefore, is to provide machined vertical plank wall construction items which will be supplied as individual pieces but which will also carry the assurance that they will all be of uniform dimensions in that they will have been produced on machines, at the factory, which insure uniform form and dimension.

A further object of this present invention is to provide wall construction for housing which can be assembled on a job very quickly with a minimum of skilled labor.

A further object of this invention is to provide a wall structure made of vertically disposed overlapping wooden planks which are so marginally machined as to insure a water and weather tight construction even though the moisture content and as a consequence the transverse dimensions of the material may vary through quite a range.

Further objects, advantages and capabilities will be apparent from the description and disclosure in the drawings, or may be comprehended or are inherent in the device.

In the drawings:

FIGURE 1 is a perspective view which is broken away at several points and sectioned to better illustrate the adaptability of this present wall construction to modern housing.

FIGURE 2 is an end view of a typical plank used in this form of wall construction.

FIGURE 3 is a horizontal cross sectional view taken through the end corner of a house using this form of wall structure and also illustrating how it accommodates window openings.

FIGURE 4 is a cross sectional view similar to FIGURE 3 but illustrating the expedient employed where the outside planks form the corner in distinction to FIGURE 3 where the inside planks form the corner.

FIGURE 5 is a broken vertical cross sectional view showing in a foreshortened arrangement the top and bottom associate members employed with this plank wall construction of the simplest form of unfurred wall.

FIGURE 6 is a cross sectional view through a corner of a house similar in some respects to FIGURES 3 and 4 but illustrating the construction used where no inside furred out, finished wall is employed.

FIGURE 7 is a vertical cross sectional view illustrating the members necessary to adapt this present wall construction to a door opening using the single wall.

FIGURE 8 is a horizontal cross sectional view taken along the line 8—8 of FIGURE 7.

FIGURE 9 is an edge view, normally a vertical view, of one of the outside plank members.

FIGURE 10 is a view similar to FIGURE 9 excepting that it illustrates the edge of a vertical disposed inside member.

FIGURE 11 is a vertical edge view of the inner plank as used where no firring is used.

FIGURE 12 is a vertical sectional view through a wall at a door opening and illustrating the manner of carrying the wall loading over the door.

FIGURE 13 is a vertical sectional view through a typical wall of the preferred form, illustrating the use of the two lengths of siding planks.

Referring to the drawings, throughout which like reference characters indicate like parts, a typical example of this vertical plank wall construction is given. Included also are those elements which have been found to be essential adjuncts to the successful use of this form of wall and which items also adapt this unusual structure to the various contingencies that arise in home building such as window, door openings, corners, the plank end engagement members and the like.

Referring to FIGURES 1 and 3 it is to be noted that outside vertically disposed planks 14 are employed and these are disposed vertically at spaced intervals. Coacting with these outside planks are inside vertically disposed planks 16. The inside and outside planks are normally of identical construction as far as the cross section of the planks are concerned. A preferred form for planks 14 and 16 is shown in the end view of FIGURE 2 in which it will be noted that both margins of the plank are machined to provide on their contacting sides 13 and 15 respectively provide an overhanging lap portion 18 having an inner wall parallel to the plane of said planks, a tongue portion 20 having a pressure face parallel to the plane of said plank, an outer wall 20a and an inner wall 20b and a recess portion 22 having the outer wall 20b which is common with tongue 20 and an inner wall 22a. The outer corners of the plank may be curved with a bull-nosed cutter as at 24 or they may be run up with straight sides to the square corner 26 in accordance with the other design features of which the planks are a part. The plank portion between the machined edges is parallel sided and of full plank thickness.

The form of plank shown in FIGURE 2 may of course have any reasonable width, however, experience has proven that an overall width of 8 inches, which when machine clearances are taken out becomes 7 and 5⁄8 inches, when used with a thickness of 1 and 5⁄8 inches net provides a desirable cross section. This proportion reduces the change in width and thickness due to change in moisture content within the limits that can be taken care of by the marginal joints used with this structure. Referring particularly to the showing in FIGURE 2 it is to be noted that the machining of tongues 20 and grooves 22 provides for definite and equal clearance angles at 19 and 21 and an equal bevel at 23 of which one example is given. The tongue has unequal sides, the longer of which is greater than one third of the plank thickness. The groove has unequal sides, the longer of which is greater than one third of the plank thickness. Nailing should follow the indication shown in FIGURE 3 where the nails 28 are driven through tongue 20, of the outer planks, in a diagonal manner. The normal shrinkage or swelling of the individual planks from season to season, due to changes of humidity in the ambient air, will be taken care of by the clearance of the interlocking marginal tongue and groove arrangement and this will prevent the checking or splitting of the individual planks. This clearance is shown at 29 in FIGURES 3, 4, 6 and 8. Studies indicate a slight separating movement of planks 14 and 16 when the sharply beveled faces 23 of the two coacting planks 14 and 16 contact firmly because of shrinkage of the planks thus avoiding splitting of the planks. When the reverse condition of swelling occurs the two equal angled surfaces 19 and 21 of the coacting planks are able to accept pressure with a slight tendency to slip under heavy pressure. Under normal swelling there is no danger of splitting the planks.

This form of joint has been tested under laboratory conditions where a box is made of this material and a blower, capable of raising a water column 2 and 3/4 inches in a manometer, will not show any leakage under a smoke test. A pressure of this order is the equivalent of a fifty mile per hour wind and tends to prove the weather tightness of this joint. This coacting joint arrangement provides six hidden corners and connecting flat pressure faces, one forming the bottom of the recess and one the outer end of the tongue, on each of the two joining plank edges and forms an extended labyrinth seal which insures a weather tight marginal joint on each edge of each plank.

This vertical plank wall lends itself to a variety of constructions. In its simplest form the two layers of planks which overlap each other gives a sufficient wall thickness for use in moderate temperatures and has the added virtue that it is a wall built with minimum expense and is practically vermin free in that there is no inaccessible interior wall space. This form of structure is illustrated in FIGURE 6.

Where weather extremes of temperature must be met it is desirable to use an interior wall supported on furring from the inner layer of planks and this construction is illustrated in FIGURES 3 and 4, a preferred form of furring being to use 2 by 2 material horizontally on or about 16 inch centers. To this interior furring any desirable type of inner finish wall may be applied.

One satisfactory form of wall structure is illustrated in FIGURE 5 in which it will be noted that a sill member 30 is provided which normally lies on top of the floor 32 and overhangs the same outwardly so that it may serve as a water table and its form conforms to this well known shape. Both the inside and outside planks as 16 and 14 respectively are bevelled on their lower ends to fit the bevel of the sill, except, that for certain forms of construction, the inner extending portion of planks 16 may be cut off as is indicated at 17 in FIGURES 5 and 10. At their upper ends the planks are square-cut so that a continuous plate member 34 may be employed to insure alignment of the various planks at their upper margins, it being noteworthy that the sills 30 provide this same function at the bottom ends. This upper portion is not new in this present case but is shown in the Lahti Patent No. 2,300,937 as noted in the preamble of this application. Applicant uses this form in a portion of the single wall types of construction which are supplied to meet the need for ease of erection by unskilled help. The Lahti patent and this present application are licensed by the same corporation. This top and bottom construction together with the fact that the outer wall planks overlap the inner wall planks in the proportions illustrated 1 and 5/8 inches along each margin, and this, because of the unique construction of the marginal joints, insures a weather tight wall.

A preferred corner for a house is made after the showing of FIGURES 3, 4 and 6 in which the two members forming the corner whether they are of the inside plank group or outside plank group are bevelled at 45% so as to form the mitre joints illustrated in the figures noted. FIGURE 6 conforms to FIGURE 3 wherein the mitre is made in planks of the inner run whereas in FIGURE 4 the mitre is made in planks of the outer run. Where no inside furred wall is to be used it is normally sufficient to employ a piece of bull-nosed molding 36 to seal the corners. This is usually set in glue as is the mitre joint itself. The glue line of the joint proper is shown in somewhat exaggerated scale at 38.

In FIGURES 3 and 4 furring, which is normally dressed 2 by 2 material, is shown at 40 and 42 and in association with this furring any form of inside wall 44 may be employed.

Following out the general plan of this invention it is necessary to provide additional joining members at the various openings as for instance the narrow outside plank members shown at 46 in FIGURE 3 or the narrow inside plank members 48 shown in FIGURES 6 and 8 where they abut a window or door opening, respectively, the window being indicated at 50 and the door at 52. Due to the fact that the firring runs in a horizontal direction and the planks in a vertical direction, it is necessary to provide wire-chase channels and these have been indicated at 54.

The window framing 56 and the door framing 58 follow conventional framing practice. In order to carry the wall structure across the top of window and door openings the structure best illustrated in FIGURES 1 and 12 is preferably employed in which a 2 by 12 header as 60 is employed together with two 2 by 6's as 62 and 63, normally a covering is used as the plywood or other covering at 65. In most cases it is desirable to enclose the under eave overhang by a plywood member 66.

The simplest framing over doors in single wall construction is probably best illustrated in FIGURE 7 in which spaced apart horizontally disposed members 70 and 72 are employed and these are held in position by covering boards 73 and 74. The upper member 70 is engaged by plate 34 and the lower member 72 engages the top of the door framing 76.

A typical wall using unequal length vertical planks is shown in FIGURE 13 wherein short outer planks 14 are used with long inner planks 16. A horizontal plank top covering board 79 is employed to provide a weather overlap for the planks and to support the eave enclosure 66 and through covering board 65 to support wall plate 67.

Considerable detail of this house structure has been shown as it is believed to be essential so that fullest employment of new structural elements can be made. It must be adaptable to a wide variety of requirements which in turn are based upon the house to be built and particularly where other materials are to be joined with the vertical plank walls in order to give pleasing architectural effects. This material has been found particularly adapted for use with partial or full stone walls for certain small areas of the house perimeter. By having the various parts, that have been detailed, made on machine equipment that insures the precise dimensioning of all the various items it then becomes a relatively simple matter to assemble these on the job and thus gain the full advantage of automation in a manufacturing plant together with the adaptability which flows from having the materials supplied to the job as individual pieces of material as contrasted with prefabricated panels and the like.

It is believed that it will be clearly apparent from the above description and the disclosure in the drawings that the invention comprehends a novel construction of shop fabricated vertical plank construction.

Having thus disclosed the invention, I claim:

1. A wall comprising shop fabricated laterally spaced apart parallelly positioned outer and inner vertical wooden planks, said outer and inner planks alternating with one another and having substantially identical cross-sections with each alternate plank facing in the opposite direction, said outer and inner planks being formed with a central portion of full thickness terminating in a precision machined margin of lesser thickness on opposite lateral margins of said planks, all of said machined margins on each plank facing in the same direction and presenting the following surfaces starting at one face of the side margin of said central portion and ending at the side margin of said plank:

(1) a rearwardly extending outwardly angled inner wall terminating in a recess;
(2) said recess;
(3) a forwardly extending side shorter than said inner wall and beveled outwardly to define one side of said recess and one side of a forwardly facing tongue;
(4) said tongue;
(5) a rearwardly extending outer wall angled outwardly to define the other side of said tongue; and
(6) an overhanging lap portion; said tongues of said outer and inner planks being fitted within the recesses thereof and the overhanging lap portions of each plank overlapping the full thickness portions of the oppositely facing planks adjacent thereto.

2. A wall as recited in claim 1 in which said recess is wider than said tongue.

3. A wall as recited in claim 1 in which said rearwardly extending inner and outer walls have a length greater than one-third of the full thickness of said planks.

References Cited in the file of this patent

UNITED STATES PATENTS

| | | |
|---|---|---|
| 637,212 | McCune | Nov. 14, 1899 |
| 651,873 | Ludowici | June 19, 1900 |
| 670,723 | Nebeling | Mar. 26, 1901 |
| 765,930 | Mahony | July 26, 1904 |
| 1,747,313 | Miss | Feb. 18, 1930 |
| 1,987,828 | Horn | Jan. 15, 1935 |
| 2,025,815 | Horridge | Dec. 31, 1935 |
| 2,142,305 | Davis | Jan. 3, 1939 |
| 2,300,937 | Lahti | Nov. 3, 1942 |
| 2,320,466 | Presley | June 1, 1943 |

FOREIGN PATENTS

| | | |
|---|---|---|
| 526,049 | Germany | Dec. 11, 1928 |
| 78,804 | Norway | July 16, 1951 |
| 478,252 | Canada | Nov. 6, 1951 |
| 749,003 | Great Britain | May 16, 1956 |